United States Patent
Kogane et al.

Patent Number: 5,448,293
Date of Patent: Sep. 5, 1995

[54] TELEVISION CAMERA EQUIPPED WITH CONTINUOUSLY-VARIABLE-SPEED ELECTRONIC SHUTTER FUNCTION

[75] Inventors: Haruo Kogane, Kawasaki; Hidetoshi Mimura, Yokohama, both of Japan

[73] Assignee: Matsushita Electric Industrial Co., Ltd., Osaka, Japan

[21] Appl. No.: 266,334

[22] Filed: Jul. 1, 1994

Related U.S. Application Data

[63] Continuation of Ser. No. 865,441, Apr. 9, 1992, abandoned.

[30] Foreign Application Priority Data

Apr. 24, 1991 [JP] Japan .................................. 3-094428

[51] Int. Cl.⁶ ............................................ H04N 5/335
[52] U.S. Cl. ................................ 348/229; 348/221; 348/296; 348/297
[58] Field of Search ............... 348/229, 296, 297, 255, 348/362, 364; H04N 5/335

[56] References Cited

U.S. PATENT DOCUMENTS

| | | | |
|---|---|---|---|
| 4,635,126 | 1/1987 | Kinoshita | 348/297 |
| 4,695,888 | 9/1987 | Peterson | 358/213.13 |
| 4,843,476 | 6/1989 | Fujioka et al. | 358/228 |
| 5,040,070 | 8/1991 | Higashitsutsumi et al. | 358/213.13 |
| 5,157,502 | 10/1992 | Nakajima et al. | 358/213.19 |

FOREIGN PATENT DOCUMENTS

| | | | |
|---|---|---|---|
| 0053886A2 | 6/1982 | European Pat. Off. | H04N 5/19 |
| 0393401A2 | 10/1990 | European Pat. Off. | H04N 5/238 |
| 0400605A2 | 12/1990 | European Pat. Off. | H04N 5/235 |
| 0416781A2 | 3/1991 | European Pat. Off. | H04N 5/235 |
| 64-29967 | 2/1989 | Japan | H04N 5/235 |

*Primary Examiner*—Michael T. Razavi
*Assistant Examiner*—Andrew B. Christensen
*Attorney, Agent, or Firm*—Stevens, Davis, Miller & Mosher

[57] ABSTRACT

A television camera equipped with a continuously-variable-speed electronic shutter function which can control the charge-storing time of a solid-state image sensor and an amplifier so that a video signal follows the optimum light amount for a subject at high speed and with high accuracy. A shutter-equipped image sensor which is controlled by a shutter pulse generating unit, converts light incident on an optical lens into an electric signal. The electric signal, after being passed through an amplifier and a signal processing unit, is detected by a video level detecting unit as a video level. A shutter control unit holds the shutter amount corresponding to the video level for each field to immediately calculate an estimated shutter amount by using a predetermined equation, and supplies the calculated shutter amount to the shutter pulse generating unit for each field. A control mode decision unit exclusively controls a gain control unit serving as an AGC and the shutter control unit.

6 Claims, 3 Drawing Sheets

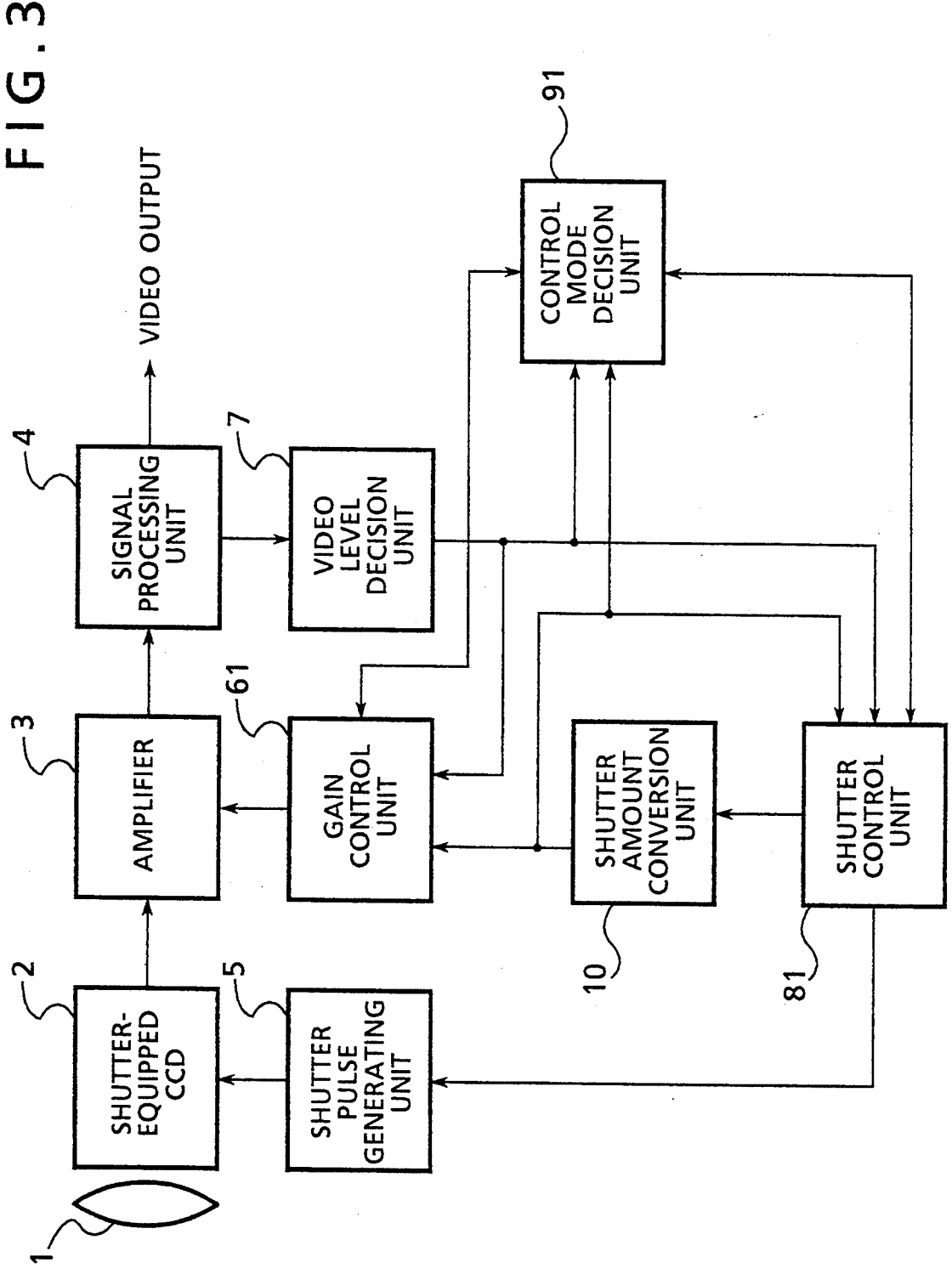

TELEVISION CAMERA EQUIPPED WITH CONTINUOUSLY-VARIABLE-SPEED ELECTRONIC SHUTTER FUNCTION

This application is a continuation of application Ser. No. 07/865,441, filed Apr. 9, 1992 now abandoned.

BACKGROUND OF THE INVENTION

1. Field of the Invention

The present invention relates to a television camera equipped with a continuously-variable-speed electronic shutter function which is used for successively photographing or picking up a moving object or the like.

2. Description of the Related Art

The prior art shutter-equipped television camera belonging to the above category is arranged as shown in FIG. 1, which is disclosed in Japanese Utility Model Laid-open No. Showa 64-29967 (1989). In FIG. 1, an optical lens 11 focuses the image of an object on a solid-state image pick-up device (image sensor) 12. A driving circuit 13 drives the image sensor 12 in a television system, and a shutter driving circuit 14 controls the photo-sensing time of the image sensor 12. A sampling circuit 15 converts the output from the solid-state image sensor 12 into a video signal which is supplied to an average level detecting circuit 16 and an amplifier 17. The average level detecting circuit 16 detects the average level of the video signal and supplies the corresponding signal to the shutter driving circuit 14. The gain of amplifier 17 is controlled by an automatic gain controlling circuit (simply referred to as AGC). Amplifier 17 amplifies the video signal to a predetermined level to be supplied to a succeeding amplifier 19.

The operation of the above prior art will be explained below. In FIG. 1, when the brightness of a subject of the optical lens 11 changes, the output from the solid-state image sensor 12 changes. This leads to a change in the video signal output from the sampling circuit 15. The average level detecting circuit 16 detects this change as an average level and the corresponding control signal to the shutter driving circuit 14 (i.e. the image pick-up system operates in only the AGC mode). When the accumulation time T is lower than upper limit time Tu, both the gain G and the accumulation time T (i.e. the shutter amount) are controlled in accordance with the brightness information Ev to control the photo-sensing time of the solid-state image sensor 12. The amplifier 17 and AGC 18 amplify the video signal output from the sampling circuit 15 so it is maintained at a predetermined level; the amplified signal is supplied to the succeeding amplifier 19.

In this way, the prior art shutter-equipped television camera can automatically adjust the photo-sensing degree or sensitivity of the image sensor 12 in accordance with a change in the brightness of the subject.

However, the prior art shutter-equipped television camera, in which the shutter driving circuit 14 provides control with a reduced number of steps using an up-/down counter and an ROM with a low-accuracy shutter number, cannot also enhance the accuracy of the average level detecting circuit 16 and hence cannot responds to an extreme change in the brightness of the subject.

SUMMARY OF THE INVENTION

An object of the present invention is to solve the problem of the prior art and to provide an excellent variable-shutter-equipped television camera which can respond to a change in the brightness of a subject with high accuracy and at high speed, and maintain the video signal at a predetermined level.

Another object of the present invention is to provide an excellent variable-shutter-equipped television camera which has the above performance and can also maintain the video signal at a predetermined level so that noise due to a shutter pulse does not affect the video signal.

In order to attain the above object, in accordance with the present invention, control is made in both AGC mode and shutter mode. Specifically, in the AGC mode, the gain of the amplifier is fixed. On the other hand, in the shutter mode, an optimum estimated shutter amount is calculated on the basis of the video signal level detected for each field, the corresponding shutter amount and a target value of the video signal level. The estimated shutter amount is supplied to a shutter pulse generating unit to drive the shutter-equipped image sensor with a continuously-variable-speed electronic shutter function.

Further, in accordance with the present invention, in the shutter mode, an optimum estimated shutter amount is calculated on the basis of the video signal level modified by a corrected gain of the detected video signal level and the corresponding shutter amount and a target value of the video signal level.

In this way, in accordance with the present invention, in the shutter mode, normal AGC control is not made, but the optimum shutter amount can be immediately calculated on the basis of the video signal level and the corresponding shutter amount and the target shutter amount, and the video signal can be placed at a predetermined level with high accuracy.

Further, in accordance with the present invention, since gain control of the amplifier can be engaged with shutter control, the video signal can be placed at a predetermined level without losing high speed performance and high accuracy, so that noise due to a shutter pulse does not invade the video signal.

The above and other objects and features of the present invention will be more apparent from the following description taken in conjunction with the accompanying drawings.

BRIEF DESCRIPTION OF THE DRAWINGS

FIG. 3 is a schematic block diagram of the television camera equipped with a continuously-variable-speed electronic shutter function.

DESCRIPTION OF THE PREFERRED EMBODIMENTS

Embodiment 1

Figure 1:
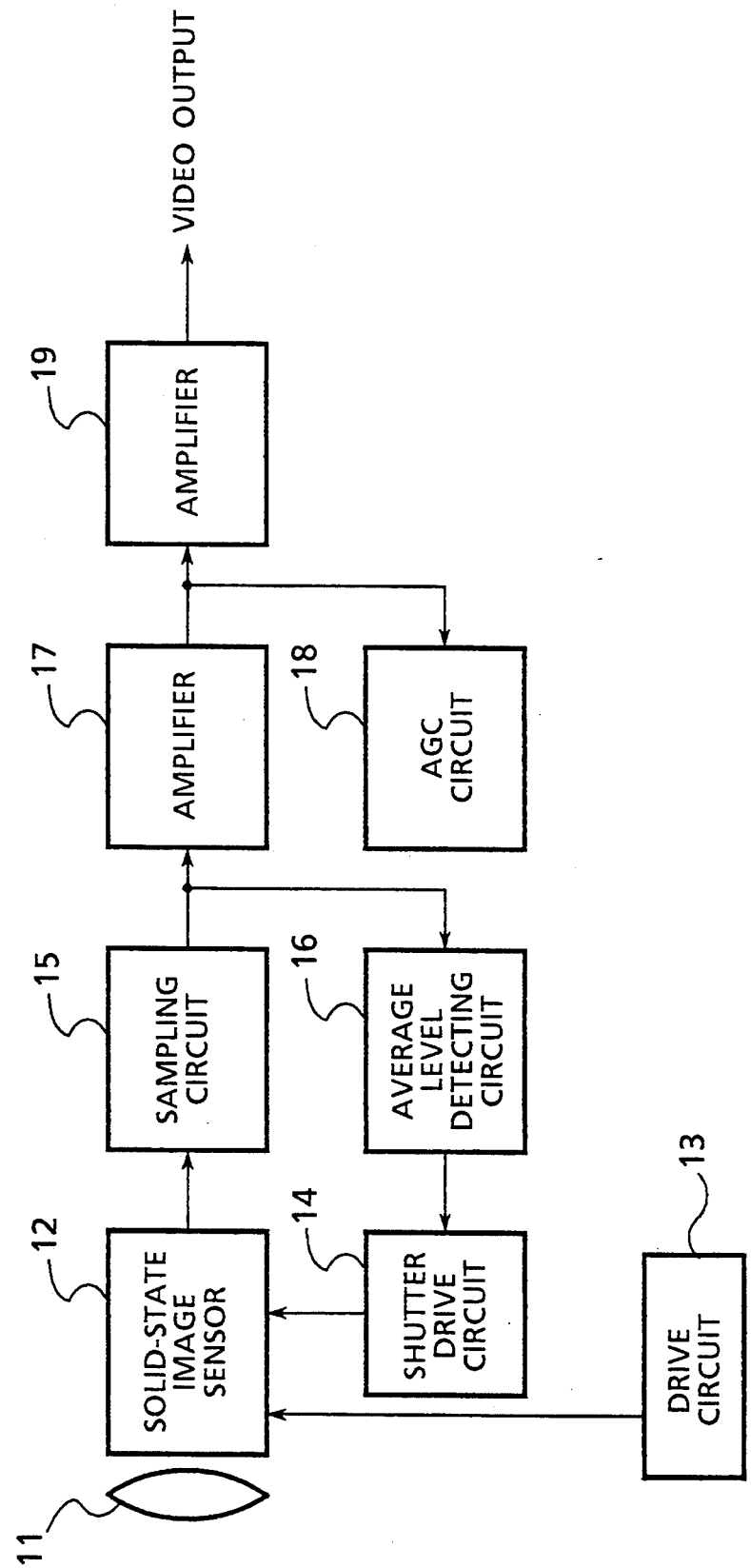
FIG. 1 is a schematic block diagram of the prior art television camera equipped with a variable shutter.
Figure 2:
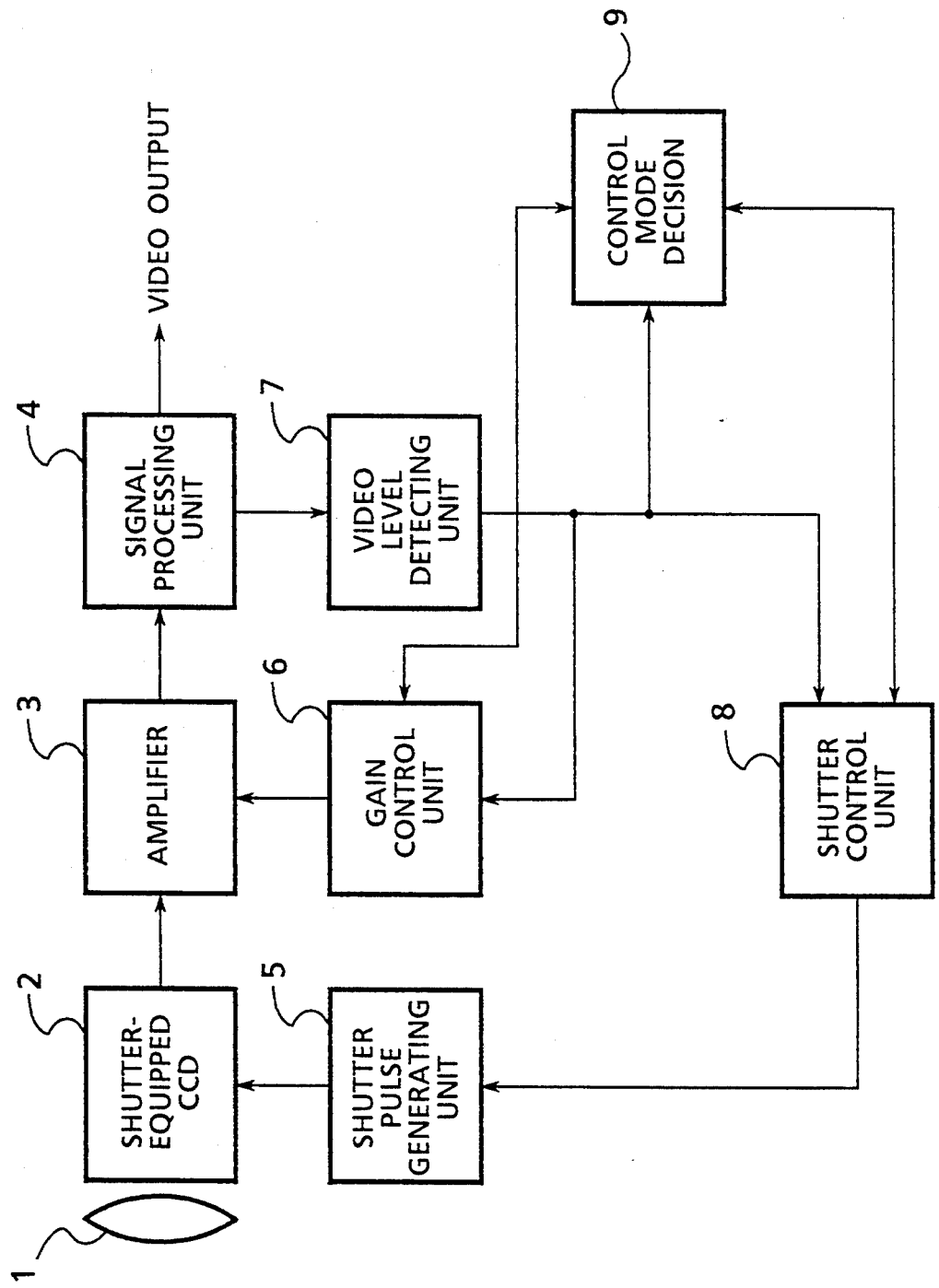
FIG. 2 is a schematic block diagram of the television camera equipped with a variable shutter according to one embodiment of the present invention.

FIG. 2 shows the arrangement of the first embodiment of the present invention. In FIG. 2, numeral 1 denotes an optical lens system which focuses the image of a subject on a shutter-equipped CCD 2, which is a solid-state image sensor. Numeral 3 denotes an amplifier which amplifies the image signal from the shutter-equipped CCD and supplies the amplified signal to a signal processing unit 4. Numeral 5 denotes a shutter pulse generating unit which determines the photo-sensing time of the shutter-equipped CCD 2. Numeral 6 denotes a gain control unit. The control mode of gain control unit 6 is changed to AGC control or fixed gain amplifying control on the basis of the signal from a control mode decision unit 9. Numeral 7 denotes a video level detecting unit which can obtain the level of the video signal during one field for each field period and supply the corresponding signal to gain control unit 6 and shutter control unit 8. The manner of detecting the level of the video signal in the video level detecting unit 7 is classified into averaging the video signal during one field and detecting its peak value. From another viewpoint, it can be also classified into detecting the video signal over an entire field of image and detecting it at a predetermined detecting point (a part of the field of image). This detecting manner can be applied to averaging the video signal in the remaining area other than the area where the video signal level exceeds a predetermined numerical value. An application thereof is the case where light, such as spot light, is incident to a part of a field of image at a point in time. Numeral 8 denotes a shutter control unit which immediately calculates an optimum shutter amount on the basis of the signal output from the video level detecting unit 7 and the current shutter amount in the shutter-equipped CCD 2 corresponding to the signal using the following equation (1), thereby supplying it to the shutter pulse generating circuit 5 so as to hold the history of the shutter amount outputted.

$$H_1 = H_0 + \Delta H_1 = H_0 + (ave_0 - m) \times k \times H_0 \quad (1)$$

$H_1$ : estimated shutter amount
$H_0$ : current shutter amount
$\Delta H_1$ : correction shutter amount
$ave_0$ : video level
m : target value of the video level
k : coefficient Numeral 9 denotes a control mode decision unit which always takes the shutter amount in the shutter control unit 8, the gain of the amplifier 3 and the video level after these two amounts act, thereby controlling the shutter control unit 8 and the gain control unit 6.

The operation of the video camera according to this embodiment will be explained below. When the optical lens system 1 receives the light from a subject, it focuses the image of the subject on the shutter-equipped CCD 2. The shutter-equipped CCD 2 supplies the optical signal, after subjected to charge sweeping by the shutter pulse generating unit 5, to the amplifier 3 as a video signal. The signal processing unit 4 processes the video signal for each of pixels included in a field-divided block. The video level detecting unit 7 selects a field area on the basis of the video level of each pixel in the field-divided, and calculates the video level for each field by averaging of the video level at the selected field area or by detecting its peak or on the basis of data resulting from predetermined information. The calculated result is supplied to the gain control unit 6, the shutter control unit 8 and the control mode decision unit 9.

Then, in the state where the continuously-variable-speed electronic shutter has been held in the predetermined position, the control mode decision unit 9 sets the control mode for the shutter mode on the basis of the shutter amount from the shutter control unit 8 and the video level signal from the video level detecting unit 7. Thus, the shutter control unit 8 immediately calculates an optimum estimated shutter by Equation (1) on the basis of the calculated video level, the corresponding current shutter amount and the target value of the video level; shutter control unit 8 holds the estimated shutter amount for a necessary time so that the current shutter amount corresponding to the control at issue can be obtained. The shutter pulse generating unit 5 supplies a shutter pulse to the shutter-equipped CCD 2 corresponding to the estimated shutter amount. Thus, the estimated shutter amount can be reflected on the video output.

On the other hand, in the case where the continuously-variable-speed electronic shutter is not held in the predetermined position, if the video level is lower than a necessary level, the control mode decision unit 9 sets the control mode to the AGC mode so that the amplifier 3 and the gain control unit 6 operate as an AGC. If the video level is excessively high, the control mode decision unit 9 changes the control mode from the AGC mode to the shutter mode.

In this way, in accordance with the first embodiment, if the amount of light incident on the optical lens system 1 is much the shutter control unit 8 holds the past estimated shutter. For this reason, the video level can be detected using the signal after amplified or gamma-corrected (not shown) so that the shutter amount of the video level at issue can be caused to correspond to each field.

Since the optimum estimated shutter amount can be immediately calculated from Equation (1), even if the amount of light incident from the subject changes continuously for each field, any particular sensor is not required, but the video level can be precisely controlled to provide the same target level individually from adjacent fields. Thus, the video level can always be held precisely at a predetermined level.

Further, since the control mode decision unit 9 always receives the AGC amount, shutter amount and video level, the areas to be allotted to the AGC mode control and shutter mode control can be clearly separated. Thus, the subject having a wide range of brightness can be photographed or sensed under optimum control.

Embodiment 2

FIG. 3 shows the arrangement of the second embodiment according to the present invention. In FIG. 3, like reference numerals designate like parts in FIG. 2. In FIG. 3, numeral 81 denotes a shutter control unit which has a new function in addition to the function of the shutter control unit in FIG. 2. Namely, the shutter control unit 81 can separate a minute shutter amount from the estimated shutter amount calculated from Equation (1) so that the shutter pulse does not appear during a horizontal video period. The shutter control unit 81 can also previously subtract from the video level a level amount corresponding to the above minute shutter amount as a correction gain component for the amplifier 3. The minute shutter amount is supplied to a shutter amount conversion unit 10. The shutter amount conversion unit 10 can calculate a correction gain component $\Delta g$ for the amplifier 3 on the basis of the minute control unit and the current shutter amount using Equation (2) and supplies its output to a gain control conversion unit 61.

$$\Delta g = j \times \{(ave_0 - m) \times k \times H_0 - \Delta H_1'\}/H_0 \quad (2)$$
$$= j \times \Delta h_1/H_0$$

$\Delta g$ : correction gain amount
j : coefficient
$ave_0$ : video level
m : target value of the video level
k : coefficient
$H_0$ : current shutter amount $\Delta H_1'$ : correction shutter amount after optimized
$\Delta h_1$ : minute shutter amount The gain control unit 61, under the control of a control mode decision unit 91, can make the AGC mode control or shutter mode control with the correction gain amount $\Delta g$ subtracted from the fixed gain. The control mode decision unit 91 has the function of the control mode decision unit 9 in FIG. 2 and also can add the correction amount as a decision factor.

The operation of the television camera according to the second embodiment will be explained below. If the brightness of a subject is sufficiently large, the video level is controlled in the shutter mode as in the first embodiment. In this case, the shutter control unit 81 calculates an estimated shutter amount from Equation (1) so as to separate a minute shutter amount so that any shutter pulse does not appear during a horizontal video period. The estimated shutter amount is supplied to the shutter pulse generating unit 5 whereas the minute shutter amount is supplied to the shutter amount conversion unit 10. If the shutter amount is so great that some shutter pulse appears during a vertical blanking period, the shutter control unit 81 determines the estimated shutter amount so that the minute shutter amount to be separated does not become great. Thus, the shutter pulse generating unit 5 can always generate pulses during the vertical and horizontal blanking period in accordance with the estimated shutter amount to control the shutter-equipped CCD 2.

If the shutter amount conversion unit 10 converts the minute shutter amount into the correction gain amount $\Delta g$ using Equation (2), the gain control unit 61 reduces the gain of the amplifier 3 from the predetermined fixed gain by the correction gain amount. This operation is always controlled by one field behind the field of the video signal when controlled by the estimated shutter amount.

Since the shutter amount conversion unit 10, like the shutter control unit 81, holds the past necessary history of the correction gain amount, the video level can be controlled by the shutter amount which is derived from the signal obtained when the video level detected by the video level detecting unit 7 is modified by the shutter control unit 81.

In this embodiment, as in the first embodiment, when the brightness of the subject changes, the video level detected by the video level detecting unit 7 also changes. However, unlike the first embodiment, in this embodiment, the shutter control unit 81 separates the minute shutter amount in calculating the estimated shutter amount using Equation (1). The amplifier 3, therefore, can compensate for the limited function of the shutter pulse generating unit 5. As a result, this embodiment can precisely hold the video signal level at a fixed level without being affected by any shutter pulse.

We claim:

1. A video camera comprising:
    an image sensor, including a continuously-variable-speed electronic shutter, for converting an optical signal into an electrical signal and outputting a video signal;
    a lens for focusing an image of a subject on said image sensor;
    an amplifier for amplifying said video signal and outputting an amplified signal;
    signal processing means for processing said amplified signal and outputting a processed video signal;
    video level detecting means for detecting a level of said processed video signal for each field and outputting a signal representing a detected video signal level;
    gain control means for controlling a gain of said amplifier so as to maintain the signal representing the detected video signal level at a fixed value in an AGC mode;
    shutter control means for calculating an estimated shutter amount, in a shutter mode, said shutter control means comprising means for (i) subtracting a target value of the video level from the detected video signal level to obtain a difference, (ii) multiplying the difference by a coefficient and a current shutter amount, corresponding to a preceding estimated shutter amount, to obtain a correction shutter amount, and (iii) adding said correction shutter amount to the current shutter amount to obtain said estimated shutter amount;
    shutter pulse generating means for supplying a shutter pulse to said image sensor in accordance with said estimated shutter amount; and
    control mode decision means for automatically placing said gain control means and the image sensor in said AGC mode or said shutter mode, in accordance with (i) said signal representing the detected video signal level, (ii) said estimated shutter amount, and (iii) said gain of said amplifier, said control mode decision means operating independently of whether an amount of light of the optical signal is constant.

2. A video camera according to claim 1, wherein said signal processing means divides the signal supplied from said amplifier on a field-by-field basis to process the signal.

3. A video camera according to claim 1, wherein said video level detecting means selects a part of the field area corresponding to the signal supplied from said signal processing means.

4. A video camera comprising:
    an image sensor, including a continuously-variable-speed electronic shutter, for converting an optical signal into an electrical signal and outputting a video signal;
    a lens for focusing an image of a subject on said image sensor;
    an amplifier for amplifying said video signal and outputting an amplified signal;
    signal processing means for processing said amplified signal and outputting a processed video signal;
    video level detecting means for detecting a level of said processed video signal for each field and outputting a signal representing a detected video signal level;
    gain control means for controlling a gain of said amplifier so as to maintain the signal representing the detected video signal level at a fixed value in an AGC mode and controlling the gain of said modifier in accordance with shutter control in a shutter mode;

shutter control means for calculating an estimated shutter amount and a minute shutter amount, in the shutter mode, said shutter control means comprising means for (i) subtracting a target value of the video level from the detected video signal level to obtain a difference, (ii) multiplying the difference by a coefficient and a current shutter amount, corresponding to a preceding estimated shutter amount, to obtain a correction shutter amount, (iii) adding said correction shutter amount to the current shutter amount to obtain an imaginal estimated shutter amount, (iv) subtracting a minute shutter amount from the imaginal estimated shutter amount to obtain the estimated shutter amount, and (v) subtracting an optimized correction shutter amount from the correction shutter amount to obtain the minute shutter amount;

shutter pulse generating means for supplying a shutter pulse to said image sensor, during a vertical or a horizontal blanking period, in accordance with said estimated shutter amount;

shutter amount conversion means for (i) converting the minute shutter amount to a correction amount by dividing the minute shutter amount by the current shutter amount and multiplying by a coefficient so as to obtain the correction gain amount, and (ii) supplying said correction gain amount to said gain control means; and control mode decision means for automatically placing said gain control means and the image sensor in said AGC mode or said shutter mode, in accordance with (i) said signal representing the detected video signal level, (ii) said imaginal estimated shutter amount, and (iii) said gain of said amplifier, said control mode decision means operating independently of whether an amount of light of the optical signal is constant.

5. A video camera according to claim 4, wherein said signal processing means divides the signal supplied from said amplifier on a field-by-field basis to process the signal.

6. A video camera according to claim 4, wherein said video level detecting unit selects a part of the field area corresponding to the signal supplied from said signal processing means.

* * * * *